United States Patent [19]

Jensen et al.

[11] 4,358,299
[45] Nov. 9, 1982

[54] GAS SEPARATOR FOR LIQUID-CONDUCTING SYSTEMS

[75] Inventors: Niels D. Jensen; Kurt F. Nielsen, both of Bjerringbro, Denmark

[73] Assignee: Grundfos A/S, Bjerringbro, Denmark

[21] Appl. No.: 272,532

[22] Filed: Jun. 11, 1981

[30] Foreign Application Priority Data

Jun. 14, 1980 [DE] Fed. Rep. of Germany ....... 3022420

[51] Int. Cl.$^3$ ............................................. B01D 45/12
[52] U.S. Cl. ........................................ 55/204; 55/439; 55/459 R; 209/211
[58] Field of Search ................ 55/204, 205, 191, 177, 55/459 R, 459 A–459 D, 437–439; 209/211; 210/512.1, 512.2

[56] References Cited

U.S. PATENT DOCUMENTS

| | | | |
|---|---|---|---|
| 1,440,808 | 1/1923 | Wineman | 55/205 |
| 3,176,912 | 4/1965 | Rollinger et al. | 55/459 R |
| 3,715,863 | 2/1973 | Zanoni | 55/204 |
| 4,216,095 | 8/1980 | Ruff | 210/512 R |

*Primary Examiner*—Bernard Nozick
*Attorney, Agent, or Firm*—Michael N. Meller; Anthony H. Handal

[57] ABSTRACT

The separator, as independent appliance or as integrated component of inline pumps, has a housing with liquid inlet and outlet connector pipes lying on one common center line and a substantially cylindrical separation chamber arranged therebetween. Into this chamber a liquid-gas mixture is introduced tangentially and set in rotation about the axis (y) of the chamber forming a center of rotation. The gas is forced to the center of rotation and conducted to the exterior while the degassed liquid flows out of the chamber through a separate opening. A plane (A) placed through the common center line (x) of the connector pipes and a plane (B) placed through the chamber axis (y) and standing perpendicularly on the plane (A) produce an intersection line (z) which forms with the center line an angle (a) in the order of magnitude of $0° < \alpha < 90°$, but preferably $\alpha \approx 45°$.

12 Claims, 3 Drawing Figures

GAS SEPARATOR FOR LIQUID-CONDUCTING SYSTEMS

BACKGROUND OF THE INVENTION

The invention relates to a gas separator for liquid-conducting systems, as independent appliance or as integrated component of in-line pumps, especially circulating pumps for heating and cooling installations, with inlet and outlet pipes for the liquid lying on one common center line and with a substantially cylindrical separation chamber arranged between the two pipes, into which chamber the liquid-gas mixture is introduced tangentially and set in rotation, by appropriate flow guidance, about the axis of the chamber forming a center of rotation, the gas being forced towards the center of rotation and conducted away to the exterior while the degassed liquid flows away out of the chamber through a separate outflow opening.

Especially in pump installations, air or gas in the liquid to be delivered is the cause of many troubles which can be divided essentially into two groups. The first group of troubles concerns problems of the installation itself, such for example as inadequate lubrication of bearings if the pump delivers oil foam, or as noise generation in heating installations due to air bubbles conveyed with the water flow. The second group of troubles referred to concerns the function of the pump and its safety. In this context it is known that the throttle curve falls with the gas proportion and operation of the pump in the part-load range causes difficulties because even slight faults on the suction side of the pump can lead to break-away of the delivery flow.

If the gas or air bubbles then unite in the installation into a larger volume and the large gas bubble then occurring, for example by reason of regulating actions, passes with the delivery flow into the impeller of the pump, failure of the pump is ordinarily to be expected. In the centrifugal field of the impeller in fact the gas volume is displaced towards the axis of rotation, where it blocks the suction side so that delivery is suppressed.

This situation is especially disadvantageous when wet-running circulating pumps for heating installations are concerned, the bearings of which are thus lubricated by the delivery flow. The gas bubble situated in the center of rotation then in fact blocks the access of liquid to the bearing, which thus runs dry. Dry-running bearings, however, are quickly destroyed, so that the pump and thus also the heating system will fail.

This problem is generally known in circles of the art, so that various gas separators, based upon the gravity or centrifugal principle, have been developed as independent appliances or equally pumps with suction housings of special configuration. In this connection reference can be made to German Publication Specification Nos. 1,653,727, 1,937,119 and 2,810,583. Separate separators usually have the disadvantages that they cannot be installed independently of position, they are of relatively large construction and are also expensive. The known special pumps are likewise subject to the same limitations of installation and further have the disadvantage that the degree of separation is very much dependent upon the delivery flow, so that the mentioned troubles in pump installations could not hitherto be eliminated.

SUMMARY OF THE INVENTION

The object of the invention is to provide a gas separator for liquid-conducting systems which can be installed as an independent appliance or equally as an integrated component of a pump, either in horizontally or in vertically extending conduits, that is to say is usable independently of position, and produces equally good separation results in the whole working range. The separator is also to have a small construction volume and thus low weight. Furthermore simple and cheap production and the possibility of combining the separator with a pump without problems are sought.

The gas separator according to the invention is characterized in that a plane A placed through the common center line x of inlet and outlet connector pipes and a plane B placed through the chamber axis y, which determines the center of rotation of the centrifugal field C, and standing perpendicularly on the mentioned plane A produce an intersection line z which forms with the center line x in the plane A an angle $\alpha$ of the order of magnitude $0° < \alpha < 90°$, but preferably $\alpha \approx 45°$. The separator includes a housing with the inlet and outlet connector pipes attached thereto. If integrated with a pump, the housing is the housing of the pump.

BRIEF DESCRIPTION OF THE DRAWINGS

The invention and its advantages will be described below with reference to the accompanying drawings in which.

DESCRIPTION OF THE PREFERRED EMBODIMENTS

Figures 1, 3:
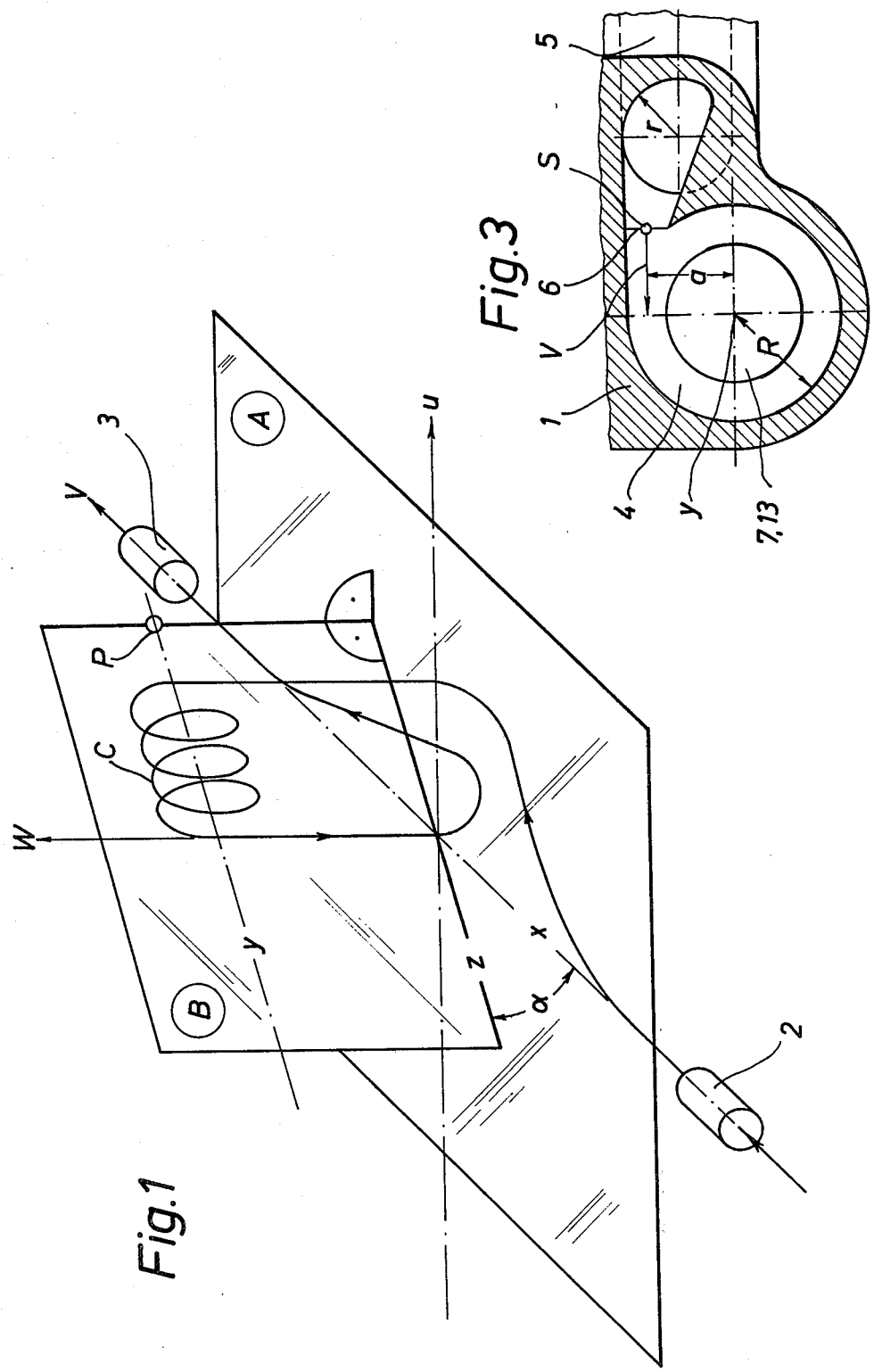
FIG. 1 is a diagrammatical view of the passage of the liquid-gas mixture through the gas separator according to the invention.
FIG. 3 shows a section taken along the line A—A in FIG. 2.

Referring to FIG. 1 the separator is aligned in an orthogonal, three-dimensional co-ordinate system with the co-ordinates u, v and w so that the center line x connecting the axes of the two connector pipes 2, 3 coincides with the co-ordinate v. The co-ordinates u and v then determine the position of a plane A. A plumb dropped, from any desired point P of the axis y of rotation of the centrifugal field C forming in the separation chamber, on to the plane A and the rotation axis y itself determine the position of a plane B which is to stand perpendicularly on the plane A. The line of intersection of the two planes A and B then forms the angle $\alpha$ with the center line x of the two connector pipes 2, 3.

In the case of a separator which is an independent appliance the axes x and y in general will lie in one plane, so that in this case z and y are identical. In the case of separators which are a part of the suction side of the pump housing, however, the chamber axis of rotation axis y must be laid as illustrated over the plane A passing through the connector pipes 2, 3 and furthermore the axis y must also frequently be arranged askew thereto. These cases are uniformly covered by the above-mentioned solution which finally also requires that the axis y should lie obliquely of the direction of throughflow of the pump or of the separator.

In order to clarify the significance and practical effect of the oblique position of the separator chamber there is to be a brief description of the forces which act upon a gas bubble situated in liquid, in the centrifugal field. These are the buoyancy $F_S$ and the centripetal force $F_Z$. With the symbols V (bubble volume), $\rho_F$ (density of the liquid), $\rho_G$ (density of the gas), u (peripheral speed), r (radius as distance of the bubble from the center of rotation) and g (gravity acceleration), for the buoyancy one obtains:

$$F_S = V \times \rho_F \times g - V \times \rho_G \times g$$

$$= V \times \rho_F \times g \left(1 - \frac{\rho_G}{\rho_F}\right) \approx V \times \rho_F \times g.$$

As centripetal force there occurs that force which acts as centrifugal force upon the liquid volume displaced by the bubble, namely:

$$F_Z = V \times \rho_F \times \frac{u^2}{r} - V \times \rho_G \times \frac{u^2}{r}$$

$$= V \times \rho_F \times \frac{u^2}{r}\left(1 - \frac{\rho_G}{\rho_F}\right) \approx V \times \rho_F \times \frac{u^2}{r}.$$

In the case of a vertical axis of the field of rotation a bubble in rotating liquid will always move on a conical spiral line towards the centre of rotation. If, however, the axis of the field of rotation lies horizontally, then it will carry out this movement only if the radial force is greater than the force of gravity, that is to say if $F_Z > F_S$ and $u^2/r > g$ are valid. From this comparison it is seen that in a position-independent device for the separation of liquid-gas mixtures a rotating flow is to be generated in which the centripetal acceleration $u^2/r$ must be greater than the gravity acceleration g or that the axis of rotation of the centrifugal field must not lie perpendicular to the direction of earth's gravity. Since in practice pumps and separators are mainly installed in vertically or horizontally proceeding conduits and the rotation axis y of the centrifugal field C will always lie according to the invention obliquely of the direction x of through-flow, the possibility of separation of liquid-gas mixtures is given especially in both cases of installation occurring in practice.

Even if the previously set separation conditions are fulfilled, appropriate precautions must be taken still for the removal of the gas bubble from the delivery flow. The liquid-gas mixture entering the separator chamber separates and forms a vortex situated in the rotation center y, while the liquid will flow on a larger radius in helical paths to the outflow opening. The gas thus separated must then still be removed from the chamber, namely with the aid of an air vent device. For this purpose the separator chamber has in its upper region in the installed position a prolongation with a cross-section reduced in comparison with the chamber cross-section, and into the prolongation there open two bores at right angles to one another of which, in dependence upon two possible positions of installation, in each case one will extend vertically and the other horizontally, so that the air vent device can be connected with the one vertical bore while the horizontal bore will be closed with a stopper. In the other possible position of installation it is the converse. Moreover then the air vent device could also be connected to the horizontal bore, if it can vent in the horizontal position. In every case the possibility is available of mounting the air vent parallel or equally perpendicular to the in-line direction.

The degree of separation is decisively dependent upon the size, form and position of the opening by which the liquid-gas mixture enters the separator chamber. The greater is the speed of entry and the larger is the entry radius, the better is the degree of separation.

The gas vortex situated in the centre line of the centrifugal field can fluctuate about the center line of the separation chamber, namely due to irregularities in the delivery flow and due to oscillations. For this reason it must be sought to stabilize the position of the gas vortex by an insert fitting and/or to shorten the length of the vortex so that its lower end cannot be drawn with the degassed liquid into the outflow opening. For this purpose an insert fitting around which the degassed liquid flows is provided in the chamber in the region of the outflow opening, which fitting reduces the length L of the chamber in the region of the center of rotation to an effective length l, the relationship $0.1 < l/L < 0.9$ being valid.

Finally it is advantageous to adjust the flow guidance in a separation chamber combined with a centrifugal pump, and the direction of rotation of the centrifugal field so that the degassed liquid passes with constant twist out of the chamber through the outflow opening into the impeller of the pump. Thus in a manner known per se the suction behavior generally is improved and especially in the case of circulating pumps their noise level is considerably reduced.

Figure 2:
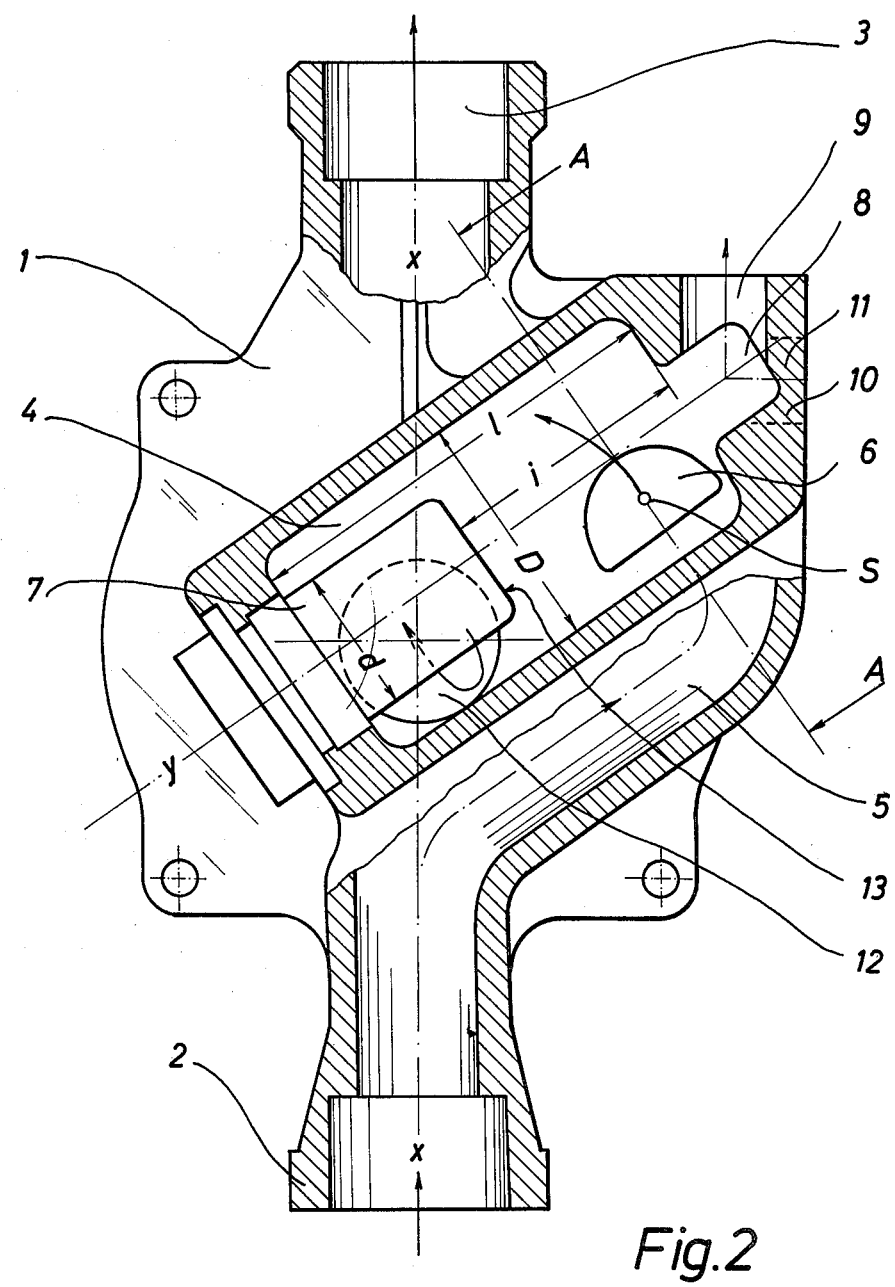
FIG. 2 shows a partial section through a pump housing in a plane of the center line x perpendicular to the pump axis, and a section placed offset thereto through the separation chamber situated thereabove, the separator being integrated into a pump.

In the accompanying FIGS. 2 and 3 a practical example of embodiment of a separator integrated into a pump is illustrated.

The entry or suction pipe 2, passing into the pump housing 1, and the exit or delivery pipe 3 have a common center line x (in-line pump) lying in the plane A (FIG. 1). The substantially cylindrical separation chamber 4, the center line of which will coincide with the rotation axis y of the centrifugal field C, lies in a further plane situated above this plane A. The liquid-gas mixture passes through the pipe 2 into the pump housing 1 and through the inflow passage 5 and the opening 6 tangentially into the chamber 4.

FIG. 3 clarifies the situation at the entry of the channel 5 into the chamber 4. Here it is important that the center of gravity S of the entry area 6 is at the greatest possible perpendicular distance a from the rotation axis y. This can be achieved in that the inflow passage 5, in the region of its entry area 6, is given a cross-section differing from a circular area, achieved for example by constriction, namely so that the mentioned distance a of the flow vector V, placed through the center of gravity S, from the axis y of the chamber 4 has the size $a > (R - r)$, with R being the radius of the chamber and r the radius of the cylindrical inflow passage 5.

According to FIG. 2 the separation chamber 4 is provided with an insert fitting 7, described below, and has above the entry area 6 an axially directed prolongation 8. Into this prolongation, which has a reduced cross-section in comparison with the chamber cross-section, there open two threaded bores 9, 10 standing at right angles to one another, of which, in dependence upon two possible installation positions, in each case one will stand vertically and the other will extend horizontally. The air vent device (not further illustrated) can then for example be screwed to the upright bore 9, while the other horizontal bore 10 is closed with a screw stopper 11. The prolongation 8 is made substantially cylindrical, as upper extension of the chamber 4. Instead of a cylindrical form for example, inter alia, a frusto-conical formation might also come under consideration. Moreover naturally only one of the two bores 9, 10 will have to be provided if the air vent device functions in either the horizontal or vertical installed position. The degassed liquid flows through the outflow opening 12 out of the chamber 4 to the pump impeller (not visible) which then forces the liquid through the exit pipe 3 into the conduit system.

The above-mentioned insert fitting 7, which in the example of embodiment has a face 13 extending transversely of the chamber axis y, on which face the gas vortex forming in the separation chamber stands, is of special importance for satisfactory degassing of the liquid-gas mixture. The insert fitting 7 reduces the length L of the chamber 4 in the region of the center of rotation or the axis y to a length l effective for the gas vortex, and here the relationship $0.1 < l/L < 0.9$ will expediently apply.

Moreover in the case of projection occurring in the outflow direction upon the opening 12, the insert fitting 7 should cover over a part of this opening, as illustrated in FIG. 2. Furthermore experiments have shown that the diameter d of the circle circumscribing the insert fitting 7 should be in the ratio $0.1 < d/D < 0.9$ to the diameter D of the chamber 4 and that the form of the insert fitting is not tied to the cylindrical form as illustrated. In fact above all the decisive point is that the face 13 forms an adequately dimensioned standing area for the gas vortex, and this face could have a course which is not necessarily absolutely flat but could also be somewhat concave.

In the form of embodiment as illustrated the insert fitting 7 extending into the chamber 4 is formed as a separate part which is removably screwed into a threaded bore of the housing 1, so that it is made possible to ascertain by experiment and install the insert which is optimal for each type of application. On the other hand the insert fitting 7 could also form one uniform casting with the housing 1, in order to reduce the costs for the production of the separator.

In the separator as described the separation of the liquid-gas mixture is effected both by gravity forces and by centrifugal forces. In the case of small delivery flows the buoyancy predominates, in the case of large delivery flows the centrifugal force predominates, so that in the entire possible working range substantially equally good separation results may be expected. This is true not only in the case of combination of the separator with a centrifugal pump, but also when the separator is installed as an independent appliance into a conduit system.

In conclusion it should be mentioned that in the intersection of the planes A and B understandably four angles are formed between the intersection line z and the axis z, which angles are equal in pairs. Admittedly according to the description the acute angle $\alpha$ in the one or the other quadrant will always determine the position of the axis y of the centrifugal field. Incidentally it would also be possible for the position of the plane B and thus that of the axis y to be rotated through 90° about the co-ordinate w in comparison with the position as shown in FIG. 1.

We claim:

1. A gas separator for removing bubbles of gas from a liquid, said separator comprising a housing, inlet and outlet connector pipes for said liquid, said pipes being attached to said housing and lying on a common center line, a substantially cylindrical separation chamber arranged between said connector pipes in said housing and spaced from said pipes, an inflow opening and flow guidance means for guiding gas-containing liquid tangentially into said chamber and setting the liquid in rotation, whereby the axis of the chamber forms the center of rotation of a centrifugal field, gas bubbles being forced to the center of rotation and conducted away to the exterior, through an outlet in said separation chamber and an outflow opening in said chamber for removing degassed liquid, wherein a first plane placed through the common center line of said connector pipes, and a second plane placed through the chamber axis perpendicular to said first plane produce a line of intersection which forms with said center line an angle ($\alpha$) in the order of magnitude of $0° < \alpha < 90°$.

2. The gas separator as claimed in claim 1, wherein $\alpha \approx 45°$.

3. The gas separator as claimed in claim 1, wherein said chamber in the region of the outflow opening is provided with an insert fitting around which degassed liquid flows tangentially and which reduces the length (L) of the chamber in the region of the center of rotation to an effective length (l), the relationship $0.1 < l/L < 0.9$ being valid.

4. The gas separator as claimed in claim 1 or 3, wherein the chamber comprises in its upper region in the installed position a prolongation with a cross-section reduced in comparison with the chamber cross-section, into which there open two bores standing at right angles to one another, of which, in dependence upon two possible installation positions, in each case one extends perpendicularly and the other horizontally, an air vent device connected with the one perpendicularly standing bore and a stopper closing the other horizontal bore.

5. The gas separator as claimed in claim 1 or 3, wherein the chamber has an inflow passage, having in the region of its entry into the chamber, a cross-section differing from a circular area in such a way that the vertical distance (a) of the flow vector (V), placed through the center of gravity (S) of the entry area, from the chamber axis has the value $a > (R - r)$, R being the radius of the chamber and r the radius of the inflow passage.

6. The gas separator as claimed in claim 3, wherein said insert fitting has a face extending transversely of the chamber axis on which a gas vortex developing in the chamber stands.

7. The gas separator as claimed in claim 3 or 6, wherein said insert fitting covers a part of the outflow opening in the case of projection upon the outflow opening occurring in the outflow direction.

8. The gas separator as claimed in claim 3 or 6, wherein the diameter (d) of the circle circumscribing the insert fitting and the diameter (D) of the chamber have the relationship $0.1 < d/D < 0.9$.

9. The gas separator as claimed in claim 3 or 6, wherein the insert fitting extending into the chamber forms a uniform casting with the separator housing.

10. The gas separator as claimed in claim 3 or 6, wherein the insert fitting extending into the chamber is formed as a separate part removably screwed into a threaded bore of the separator housing.

11. The gas separator as claimed in claim 11, wherein said separator is an integrated component of an inline pump housing.

12. The gas separator as claimed in claim 11, wherein the flow guidance in the chamber and the direction of rotation of the centrifugal field are adjusted so that the degassed liquid passes with constant twist out of the chamber through the outflow opening into the impeller of the pump.

* * * * *